May 31, 1932. M. L. HANCOCK 1,860,413
FLUID PRESSURE BRAKE
Filed Feb. 21, 1929
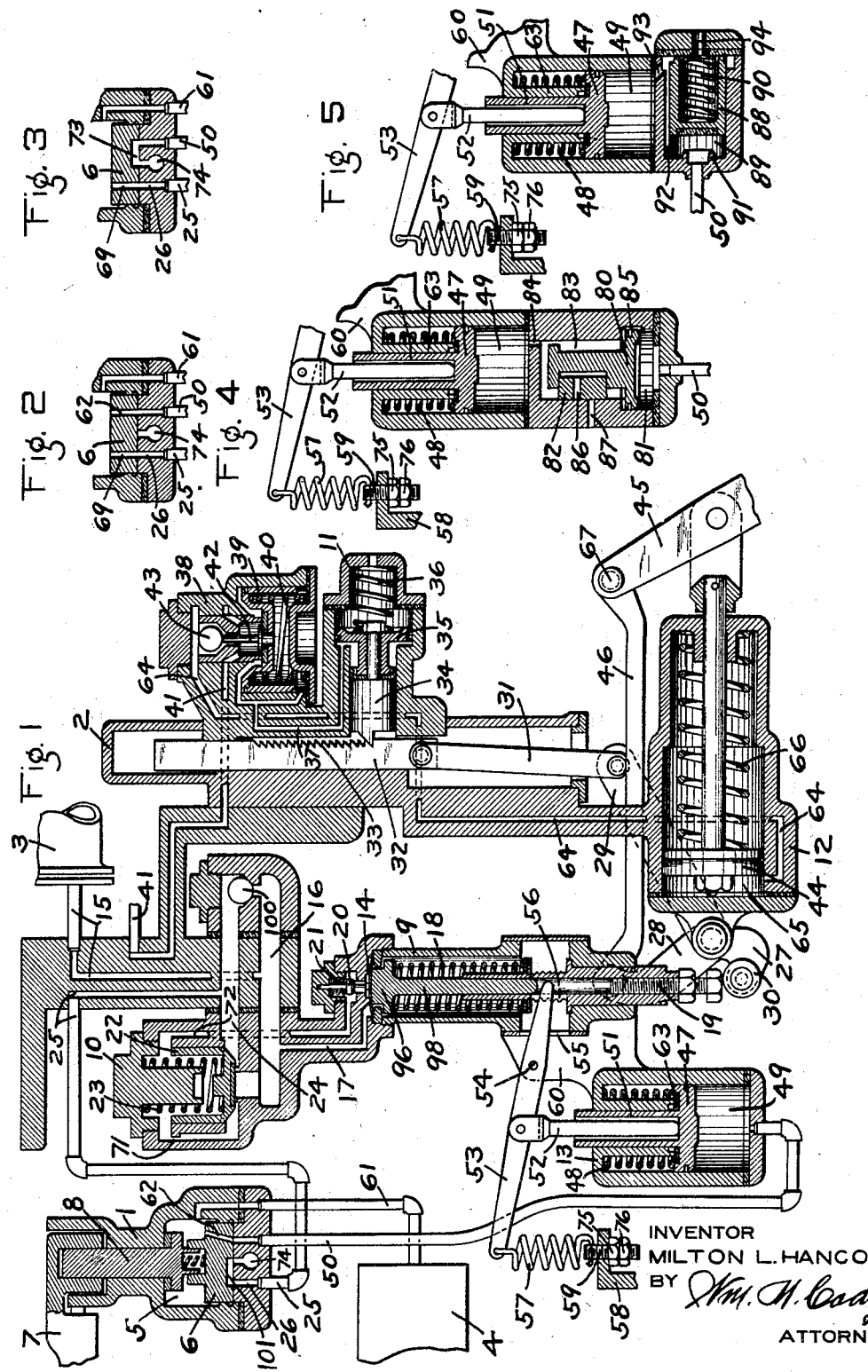
INVENTOR
MILTON L. HANCOCK
BY Wm. H. Cody
ATTORNEY Patented May 31, 1932

1,860,413

UNITED STATES PATENT OFFICE

MILTON L. HANCOCK, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed February 21, 1929. Serial No. 341,596.

This invention relates to fluid pressure brakes and more particularly to a variable load brake.

It has heretofore been proposed to provide a variable load brake equipment for varying the braking power on a car in accordance with the load carried, in which equipment separate limiting valve means were employed for regulating the braking power for both service and emergency applications.

The principal object of this invention is to provide an improved variable load brake equipment employing only one limiting valve for regulating the braking power on a car in both service and emergency applications and means for changing the adjustment of said limiting valve to increase the braking power on a car when an emergency application of the brakes is effected.

In the accompanying drawings; Figure 1 is a diagrammatic view, partly in section, of a fluid pressure brake system containing a variable load mechanism embodying my invention; Fig. 2 is a sectional view of the brake valve device, showing the rotary valve in service position; Fig. 3 is a sectional view of the brake valve device, showing the rotary valve in emergency position; Fig. 4 is a sectional view of a portion of the variable load apparatus shown in Fig. 1 and illustrating a modified form of my invention; and Fig. 5 is a sectional view of a portion of the variable load apparatus shown in Fig. 1 and illustrating another modified form of my invention.

As shown in Fig. 1 of the drawings, the fluid pressure brake system comprises a brake valve device 1, a variable load mechanism 2, a brake cylinder 3 and a main reservoir 4.

The brake valve device 1 comprises a casing having a chamber 5 containing a rotary valve 6. A handle 7 is adapted to turn said rotary valve through a key 8 disposed in a vertical bore in the casing and engaging at the lower end said rotary valve.

The variable load mechanism comprises a brake cylinder pressure limiting valve device 9, a brake cylinder supply valve device 10, a locking mechanism 11, a strut cylinder 12 and an emergency adjusting device 13.

The brake cylinder pressure limiting valve device 9 comprises a flexible diaphragm 14, which is subject on one side to the pressure of fluid in the brake cylinder 3 as supplied through passage 15, chamber 16 and passage 17, and on the opposite side to the pressure of a coil spring 18 acting on an abutment 96, which is maintained in engagement with said diaphragm by said spring. A plunger 19 engaging the free end of the spring 18 is provided in order to vary the pressure exerted by said spring. The flexible diaphragm 14 is adapted to operate a valve 20 which controls the operation of the brake cylinder supply valve device 10 and a spring 21 is provided to urge the valve 20 to its seat.

The brake cylinder supply valve device 10 comprises a valve piston 22, subject on one side to the pressure of a spring 23 and on the inner seated area of the opposite side, to the pressure in chamber 16 as supplied from the brake cylinder 3, the outer seated area of said valve piston being subject to the pressure in a chamber 24, which is connected through passage and pipe 25 to the service port 26 in the brake valve device 1.

Pivotally mounted on the cap of the strut cylinder 12 is a member having crank arms 27, 28 and 29. A roller 30 pivotally mounted on crank arm 27 is adapted to engage one end of the plunger 19 for effecting an adjustment of the spring 18, according to the load on the car.

The crank arm 29 is connected by a link 31 to a ratchet bar 32 which is slidably mounted in the locking mechanism casting. The teeth 33 of the ratchet bar 32 are engaged by a pawl 34 which is operatively connected to a piston 35. This piston 35 is subject on one side to the pressure of a spring 36 and on the opposite side to the pressure of fluid as supplied through passage 37 from a valve device 38.

The valve device 38 comprises a valve piston 39 subject on one side to the pressure of a spring 40 and on the inner seated area of the opposite side to the pressure of fluid in passage and pipe 41 which is connected to the usual door opening pipe (not shown). Secured to the seating face of the valve piston 39 is a stem member 42, which engages a ball check valve 43 and is adapted, when said valve piston is held seated by the spring 40, to hold the ball check valve 43 from its seat.

The strut cylinder 12 is carried by the locking mechanism casting and contains a piston 44, the stem of which is pivotally connected to a lever 45. The lever 45 is pivotally connected at one end to a rod 46, which in turn is pivotally connected to the crank arm 28. The other end of lever 45 is pivotally connected to a member (not shown) mounted upon the car body, said member being adapted to engage another member on the car truck for adjusting the variable load mechanism in a manner disclosed in Letters Patent No. 1,572,196 granted to Clyde C. Farmer on February 9, 1926.

The emergency adjusting device 13 is preferably mounted on a bracket 60 secured to the casing of the limiting valve device 9 and comprises a piston 47 subject on one side to the pressure of a spring 48 and subject on the opposite side to the pressure of fluid in chamber 49, which is supplied thereto through pipe 50 from the brake valve device 1, in all positions of said brake valve device except emergency position. In emergency position pipe 50 is connected to the atmosphere, as shown in Fig. 3 of the drawing.

The piston 47 has an upwardly extending hollow stem 51 mounted in a suitable bore in the casing, and loosely contained in the piston stem 51 is a push rod 52. The upper end of said push rod is pivotally connected to a lever 53, which lever is pivotally mounted on a fulcrum pin 54 in the casing. One end of the lever 53 extends through an opening 55 in the casing of the limiting valve device and through an elongated slot 56 in the plunger 19, and within said slot is adapted to engage the end of a stem 98 secured to the abutment 96. The other end of said lever is connected to one end of a tension spring 57, the other end of said spring being connected by an adjusting screw 59 to a bracket 58 mounted on the car body.

In operation, fluid under pressure is supplied from a main reservoir 4 to the rotary valve chamber 5 of the brake valve device 1 through pipe and passage 61. With the brake valve in running position, as shown in Fig. 1 of the drawing, fluid under pressure flows from the rotary valve chamber 5 through port 62 in the rotary valve 6 and passage and pipe 50 to piston chamber 49 of the emergency adjusting device 13 and acts on the piston 47. The piston 47 is thereby moved upwardly against the pressure of spring 48 to the position shown in the drawing, in which piston 47 engages a stop 63. Upward movement of said piston causes the push rod 52 to rotate the lever 53 clockwise on the fulcrum 54, so that the right hand end of said lever does not engage the abutment stem 98, but instead is located in an intermediate position in the slot 56 in the plunger 19.

When the brake valve device is in release position, the brake cylinder 3 is connected to the atmosphere through pipe and passage 15, chamber 16, past the ball check valve 100, chamber 24, passage and pipe 25, port 26 in the brake cylinder device, cavity 101 in the rotary valve 6 and the atmospheric passage 74.

When the car doors are opened, fluid under pressure is supplied in the usual way to the door opening pipe 41 and flows therefrom through passage 41 to the inner seated area at the upper side of valve piston 39. The valve piston 39 being held seated by spring 40, fluid under pressure from passage 41 flows past the ball check valve 43 and through passage 64 to the strut cylinder 12. The fluid pressure thereby builds up in chamber 65, on the piston 44 and forces said piston outwardly against the pressure exerted by a spring 66. The pawl 34 being held in engagement with teeth 33 of the ratchet bar 32 by the spring 36, the crank arms 29, 28 and 27 are held against movement, so that the pivot pin 67 acts as a fulcrum for the lever 45, so that outward movement of the strut piston 44 will rotate the lever 45 about the pivot 67 an amount varying with the load on the car, in the usual manner The spring 40 is of such resistance as to hold the valve piston 39 seated in the position shown in the drawings, until after the strut piston has moved outwardly as hereinbefore described, at which time the fluid pressure acting on the inner seated area on the upper face of said valve piston becomes sufficient to shift said valve piston to its downward position, in which the ball check valve 43 is permitted to seat and fluid under pressure then flows from passage 41, past the valve piston 39 and through passage 37 to the left hand side of pawl piston 35. The pawl piston 35 is thereby moved to the right against the pressure exerted by spring 36, so as to disengage the pawl 34 from teeth 33 of the ratchet bar 32.

If the car load is now increased, the lever 45 is rotated in a clockwise direction, which, through the rod 46, also rotates the crank arms 27, 28 and 29 in a clockwise direction. Such rotation of crank arm 27 causes the roller 30 to force the plunger 19 upwardly and compress the limiting valve spring 18 an amount corresponding to the increase of the load on the car. Clockwise rotation of crank arm 29 pulls the ratchet bar 32 downwardly a distance corresponding to the load change on the car.

When the car has been loaded and the car doors are closed, the fluid under pressure is vented from the door opening pipe 41 in the usual manner. The fluid pressure is thereby vented from the chamber at the left hand side of the pawl piston 35 by way of passages 37 and 41, and spring 36 then forces the pawl 34 into engagement with the teeth 33 of the ratchet bar 32, so as to maintain the ratchet bar and the crank arms 27, 28 and 29 and the limiting valve spring 18 in the newly adjusted position. After the pawl thus moves into engagement with the teeth 33 of the ratchet bar 32, the valve piston 39 is shifted to its upper position by spring 40. The ball check valve 43 is thereby unseated, which permits the fluid under pressure to be vented from the chamber at the left side of the strut piston 44. The strut piston is then moved back to its normal position, as shown in the drawings, by the pressure exerted by spring 66.

It is evident that the apparatus will operate in the manner hereinbefore described to increase or decrease the pressure of the limiting valve spring 18 in accordance with the load carried on the car.

In order to effect a service application of the brakes for stopping the car at the next loading place, the brake valve handle 7 is operated to turn the rotary valve 6 to the service position shown in Fig. 2 of the drawings. In service position of the brake valve, fluid under pressure flows from the rotary valve chamber 5, which is connected through passage and pipe 61 to the main reservoir 4, through ports 69 and 26, and pipe and passage 25 to chamber 24 in the variable load device, wherein it acts on the exposed area of the valve piston 22. Said valve piston is then unseated, permitting fluid to flow to chamber 16, thence through passage and pipe 15 to the brake cylinder 3.

Fluid from chamber 24 also flows through the restricted port 71 to the spring side of valve piston 22 and escapes therefrom through passage 72, past the unseated limiting valve 20, thence through passage 17, chamber 16 and passage and pipe 15 to the brake cylinder 3.

The pressure of fluid supplied to the brake cylinder 3 is thus effective on the upper face of the diaphragm 14 due to the connection through passage 17 to the chamber 16, and when said pressure is increased a predetermined degree, corresponding to the previous adjustment of the limiting valve spring 18, in accordance with the load on the car, the diaphragm 14 is deflected downwardly against the pressure exerted by spring 18. The valve 20 is then seated by spring 21.

Seating of valve 20 prevents further escape of fluid under pressure from the spring side of the valve piston 22. The fluid pressure then quickly equalizes on the opposite sides of said valve piston through the restricted passage 71, so that the spring 23 will seat said valve piston and prevent further flow of fluid to the brake cylinder.

In service position of the brake valve device, the pressure of the fluid in the emergency adjusting piston chamber 49 is maintained, due to the connection through pipe and passage 50 and port 62 in the rotary valve 6 to the chamber 5, so that the emergency adjusting device 13 remains inoperative.

In order to effect an emergency application of the brakes, the brake valve handle 7 is operated to turn the rotary valve 6 to emergency position, as shown in Fig. 3 of the drawings. In emergency position of the brake valve device, fluid under pressure flows through port 69 in the rotary valve 7 and passage and pipe 25 to the variable load device 2 and from thence to the brake cylinder 3 in the same manner as in a service application of the brakes.

In emergency position of the brake valve device 1, the emergency adjusting piston chamber 49 is vented to the atmosphere through pipe and passage 50, cavity 73 in the rotary valve 6 and an atmospheric passage 74. The piston 47 is then shifted downwardly away from the push rod 52 by spring 48. The pressure exerted by the tension spring 57 then rotates the lever 53 counter-clockwise on the fulcrum pin 54, causing the right hand end of said lever to engage the abutment stem 98. The predetermined tension force of the spring 57 on the abutment 96 is thereby added to the pressure of the limiting valve spring 18 on said abutment and in effect is the same as if the force of the spring 18 were increased an amount equivalent to that of the spring 57.

Thus, when an emergency application of the brakes is effected, the brake cylinder pressure acting on the upper face of the diaphragm 14 must be sufficient to overcome the combined forces of the springs 18 and 57, and consequently the brake cylinder pressure obtained will be greater than that obtained in a service application of the brakes by an amount equal to the added force of spring 57. When the brake cylinder pressure does become sufficient to overcome the combined forces of the springs 18 and 57, the diaphragm 14 is deflected downwardly, thereby permitting valve 20 and valve piston 22 to operate to cut off the flow of fluid under pressure to the brake cylinder in the same manner as in a service application of the brakes.

It will be obvious, that no matter what the adjustment of the limiting valve spring 18, the predetermined force of spring 57 will always be added to the force of spring 18 on the abutment 98 so that the brake cylinder pressure obtained in an emergency application of the brakes will always be a predetermined degree greater than the pressure obtained in a service application of the brakes and will vary in accordance with the load on the car, due to the variable adjustment of spring 18.

The tension of the spring 57 may be changed, so as to obtain any desired degree of pressure increase in an emergency application of the brakes. In order to change the tension of said spring, the position of the adjusting nut 75 and lock nut 76 on the screw 59 may be varied to permit said screw to extend through the bracket only an amount sufficient to obtain the desired tension force in the spring 57 and then by means of said lock nut, such adjustment can be fixed.

In the equipment shown in Fig. 1, when effecting an emergency application of the brakes, the fluid under pressure from the emergency adjusting piston chamber 49 is vented through the brake valve device in the manner hereinbefore described. On account of the volume of said chamber and the connecting pipe 50, a certain period of time elapses between the operation of the brake valve device 1 to emergency position and the resultant movement of the piston 47. Since in effecting an emergency application of the brakes, it is desirable to obtain the brake cylinder pressure as rapidly as possible, means may be provided as shown in Figs. 4 and 5 for hastening the operation of the emergency adjusting device 13, in the manner hereinafter described.

In Fig. 4 of the drawings, the means provided for hastening the rate of venting of fluid under pressure from the piston chamber 49 comprises a piston 80 in a chamber 81 and a slide valve 82 in a valve chamber 83, the chamber 83 being connected to the adjusting piston chamber 49 through an unrestricted passage 84.

The piston chamber 81 is connected to pipe 50 from the brake valve device, and fluid under pressure supplied to said pipe from said brake valve device, when in release position, acts on the piston 80. The piston 80 is thereby shifted to the position shown in the drawings, in which fluid under pressure flows from chamber 81 through a feed groove 85 to valve chamber 83, thence through passage 84 to the adjusting piston chamber 49. The fluid pressure in chamber 49 then shifts the piston 47 upwardly, thereby rotating the lever 53 clockwise in the same manner as hereinbefore described.

When an emergency application of the brakes is effected by movement of the brake valve device to emergency position, fluid under pressure is quickly vented from the piston chamber 81 and pipe 50 through the brake valve device. The flow area of the feed groove 85 is restricted, so that the pressure in the piston chamber 81 drops more rapidly than the pressure in the valve chamber 83. The piston 85 is thereby shifted downwardly by the pressure in chamber 83 and in its downward position, port 86 in the slide valve registers with an atmospheric passage 87, thereby effecting an unrestricted connection from the valve chamber 83 and adjusting piston chamber 49 to the atmosphere. The fluid under pressure is thus quickly vented from the piston chamber 49, permitting the emergency adjusting device to operate in the same manner as hereinbefore described to increase the brake cylinder pressure in emergency.

The mechanism in Fig. 4 operates more rapidly than that shown in Fig. 1, since only the fluid under pressure from the small piston chamber 81 and pipe 50 is vented through the brake valve device. The piston 85 therefore operates sooner after movement of the brake valve device to emergency position than does the emergency adjusting piston shown in Fig. 1. After the piston 85 and slide valve 82 move, the emergency adjusting piston 47 may move almost instantly on account of the large atmospheric opening from the chamber 49.

The modified form of my invention shown in Fig. 5 is similar to the form shown in Fig. 4 and comprises a valve piston 88 contained in a chamber 89 and subject at one side to the pressure of a spring 90 for urging the valve piston to the left into engagement with a seat ring 91. In operation, when the brake valve device is in release or service position, fluid under pressure is supplied through pipe 50 to the inner seated area of the valve piston 88 when seated against the seat ring 91 by the spring 90. When the fluid pressure thus acting on said valve piston becomes sufficient to overcome the pressure exerted by spring 90, the valve piston is shifted to the position shown in the drawings, in which communication is established from pipe 50, through chamber 89, thence through a restricted passage 92 and passage 93 to the adjusting piston chamber 49. Fluid pressure thereby builds up on the adjusting piston 47, shifting said piston upwardly which rotates the lever 50 to the normal position, shown in the drawings and hereinbefore described.

When the brake valve device is moved to emergency position, fluid under pressure is vented from the pipe 50 and valve piston chamber 89. The flow rate of passage 92 being restricted, the pressure in chamber 89 is thus suddenly reduced. The pressure of spring 90 then shifts the valve piston 88 to the left, thus opening an unrestricted connection from the adjusting piston chamber 49, through passage 93 and passage 94 to the atmosphere. The pressure in piston chamber 49 is thereby suddenly reduced, permitting the adjusting piston to operate the lever 53 in the same manner as hereinbefore described.

Since only the valve piston chamber 89 and pipe 50 are vented by way of the brake valve device and the piston chamber 49 is suddenly vented upon operation of the valve piston 88, the operation of the emergency adjusting piston 47 takes place almost immediately upon movement of the brake valve device to emergency position.

While three illustrative embodiments of the invention have been described in detail, it is not my intention to limit its scope to these embodiments or otherwise than by the terms of the appended claims.

Having now described my invention, what I claim as new and desire to secure by Letters Patent, is:—

1. In a load brake apparatus, the combination with mechanism operative to limit the braking power on a car in a service application of the brakes, including means operative to adjust said mechanism in accordance with the load on the car, of means operative independently of the load on the car to adjust said mechanism for increasing the braking power in an emergency application of the brakes.

2. In a load brake apparatus, the combination with mechanism operative to limit the braking power on a car in a service application of the brakes, including means operative to adjust said mechanism in accordance with the load on the car, of means operative independently of the load on the car to adjust said mechanism for increasing the braking power in an emergency application of the brakes a predetermined amount.

3. In a load brake apparatus, the combination with mechanism operative to limit the braking power on a car in a service application of the brakes, including means operative to adjust said mechanism in accordance with the load on the car, of resilient means cooperating with said mechanism and operating independently of the load on the car for increasing the braking power in an emergency application of the brakes, and fluid pressure means for normally rendering said resilient means ineffective to increase the braking power.

4. In a load brake apparatus, the combination with mechanism operative to limit the braking power on a car in a service application of the brakes, including means operative to adjust said mechanism in accordance with the load on the car, of a spring, a lever for transmitting the pressure of said spring to said mechanism to increase the braking power limit of said mechanism, and means for rendering said spring ineffective to increase the braking power.

5. In a load brake apparatus, the combination with mechanism operative to limit the braking power on a car in a service application of the brakes, including fluid pressure means for adjusting said mechanism according to the load on the car, of additional fluid pressure means operative to increase the adjustment on said mechanism a predetermined amount in an emergency application of the brakes.

6. In a load brake apparatus, the combination with mechanism operative to limit the braking power on a car in a service application of the brakes, including means operative to adjust said mechanism in accordance with the load on the car, of a lever operatively connected to said mechanism, a spring acting through said lever to increase the braking power limit of said mechanism, and means operative in a service application of the brakes to render said spring ineffective.

7. In a load brake apparatus, the combination with mechanism operative to limit the braking power on a car in a service application of the brakes, including means operative to adjust said mechanism in accordance with the load on the car, of a lever operatively connected to said mechanism, a spring acting through said lever to increase the braking power limit of said mechanism, and means for adjusting the pressure of said spring.

8. In a fluid pressure brake system, the combination with a brake valve device and a brake cylinder, of a valve operative to supply fluid under pressure to said brake cylinder to effect an application of the brakes upon the operation of said brake valve device, means for controlling the operation of said valve, said means comprising a diaphragm, an abutment engaging said diaphragm, and a spring for urging said abutment against said diaphragm, means for adjusting the pressure of said spring according to the load on the car, a lever adapted to engage said abutment, an anchor member, a spring interposed between said anchor member and lever for operating said lever to increase the pressure on said diaphragm a predetermined degree, means for varying the force of said spring, a piston normally subject to fluid under pressure for rendering said lever inoperative and subject to atmospheric pressure when said brake valve device is in emergency position for rendering said lever operative.

9. In a load brake apparatus, the combination with a brake cylinder, of a valve for supplying fluid under pressure to said brake cylinder, means for controlling the operation of said valve, said means comprising a diaphragm subject to pressure in the brake cylinder, an abutment engaging said diaphragm, and a spring operative on said abutment with a pressure according to the load on a car, a lever operatively mounted on the casing of said means, one end of said lever being adapted to engage said abutment, an anchor member, a spring interposed between said lever and anchor member for causing said lever to engage said abutment to increase the pressure on said diaphragm in an emergency application of the brakes, a rod operatively connected to said lever and a piston adapted to be moved into and out of engagement with said rod for rendering said lever effective and ineffective.

10. In a load brake apparatus, the combination with means operative to vary the braking power in accordance with the load on a car in effecting a service application of the brakes, and means operative in effecting an emergency application of the brakes for causing the first mentioned means to increase the braking power a predetermined amount over that obtained in a service application of the brakes.

11. In a load brake apparatus, the combination with means operative to vary the braking power in accordance with the load on a car in effecting a service application of the brakes, and lever means operative in effecting an emergency application of the brakes for increasing the braking power a predetermined amount over that obtained in a service application of the brakes and operative upon the release of the brakes after an emergency application to be ineffective in a succeeding service application of the brakes.

12. In a load brake apparatus, the combination with a valve for supplying fluid under pressure to the brake cylinder, of pressure sensitive means for controlling the operation of said valve, pressure means operative at one time to control the operation of said pressure sensitive means and other pressure means operative with the first mentioned pressure means at another time to control the operation of said pressure sensitive means.

13. In a fluid pressure brake, the combination with a brake cylinder, of a valve for controlling the supply of fluid under pressure to the brake cylinder, a spring, a movable abutment subject to the opposing pressures of the brake cylinder and said spring for operating said valve, an additional spring, and means operative upon effecting an emergency application of the brakes for subjecting said abutment to the pressure of said additional spring.

14. In a fluid pressure brake, the combination with a brake cylinder, of a valve for controlling the supply of fluid under pressure to the brake cylinder, a spring, a movable abutment subject to the opposing pressures of the brake cylinder and said spring for operating said valve, an additional spring, a brake valve device, and means operative in one position of said brake valve device for subjecting said abutment to the pressure of said additional spring.

15. In a fluid pressure brake, the combination with a brake cylinder, of a valve for controlling the supply of fluid under pressure to the brake cylinder, a spring, a movable abutment subject to the opposing pressures of the brake cylinder and said spring for operating said valve, an additional spring, means for subjecting said abutment to the pressure of said additional spring, means operated by fluid under pressure for rendering said spring ineffective, and a brake valve device for controlling the fluid pressure on said fluid pressure operated means.

In testimony whereof I have hereunto set my hand, this 18th day of February, 1929.

MILTON L. HANCOCK.